United States Patent
Yochai et al.

(10) Patent No.: US 9,614,909 B2
(45) Date of Patent: Apr. 4, 2017

(54) HIGH SPEED ASYNCHRONOUS REMOTE MIRRORING

(71) Applicant: Infinidat LTD., Herzliya (IL)

(72) Inventors: Yechiel Yochai, Moshav Aviel (IL); Ayelet Shani, Moshav herev le'et (IL); Efraim Zeidner, Haifa (IL)

(73) Assignee: INFINIDAT LTD., Herzliya (IL)

( * ) Notice: Subject to any disclaimer, the term of this patent is extended or adjusted under 35 U.S.C. 154(b) by 6 days.

(21) Appl. No.: 14/092,980

(22) Filed: Nov. 28, 2013

(65) Prior Publication Data

US 2015/0149584 A1    May 28, 2015

(51) Int. Cl.
*H04L 29/08* (2006.01)
*G06F 17/30* (2006.01)
*G06F 11/20* (2006.01)

(52) U.S. Cl.
CPC ...... *H04L 67/1095* (2013.01); *G06F 11/2056* (2013.01); *G06F 17/30067* (2013.01)

(58) Field of Classification Search
CPC ................ G06F 17/30067; H04L 67/1095
See application file for complete search history.

(56) References Cited

U.S. PATENT DOCUMENTS

| | | | | |
|---|---|---|---|---|
| 6,421,701 | B1 * | 7/2002 | Elnozahy | ................. 718/100 |
| 7,539,745 | B1 * | 5/2009 | Wang et al. | ................. 709/224 |
| 7,650,341 | B1 * | 1/2010 | Oratovsky | .......... G06F 11/1435 |
| | | | | 707/999.01 |
| 2007/0185938 | A1 * | 8/2007 | Prahlad et al. | ............... 707/204 |
| 2010/0077165 | A1 * | 3/2010 | Lu | ....................... G06F 11/1451 |
| | | | | 711/162 |
| 2012/0011313 | A1 * | 1/2012 | Kopylovitz et al. | .......... 711/113 |
| 2014/0181034 | A1 * | 6/2014 | Harrison | ............. G06F 17/3007 |
| | | | | 707/646 |

* cited by examiner

*Primary Examiner* — Aaron Strange
(74) *Attorney, Agent, or Firm* — Reches Patents

(57) ABSTRACT

A method for generating remote replicates of a logical volume at a remote site, the method comprises performing a plurality of replication cycles for generating a plurality (N) of points in time replicates of the logical volume at the remote site. Wherein for each positive integer n that ranges between 2 and N, a performing of a n'th replication cycle comprises: calculating in parallel and by multiple computerized resources of a storage system, multiple n'th point in time differences of multiple subsets of the logical volume; wherein n'th point in time differences of different subsets are calculated by different computerized resources; wherein a n'th point in time difference of a subset is a difference between an (n−1)'th point in time content of the subset and an n'th point in time content of the subset; and sending, in parallel, the multiple n'th point in time differences to the remote site.

20 Claims, 9 Drawing Sheets

HIGH SPEED ASYNCHRONOUS REMOTE MIRRORING

BACKGROUND

Remote mirroring in storage systems is used to replicate logical volumes of a primary (also called 'local') storage system to a secondary (also called 'remote') storage system. In asynchronous remote mirroring, batches of updates are periodically sent to the remote site. The batches of updates are performed in cycles, wherein in each cycle the local system determines the changes that occurred in the logical volume to be replicated, since the previous cycle and transmits the changes to the remote site.

A snapshots can be taken in the local system upon starting a new cycle and the updates to be transmitted to the remote site in the new cycle are determined by comparing successive snapshots. The local system sequentially transmits all the determined updates to the remote site. Upon completion of the cycle, a snapshot of the mirrored volume is taken at the remote system to reflect a valid replica of the local volume and can be used for restoring a compatible and consistent state of the mirrored volume, in case of a restart after failure of the remote system.

FIG. 1 is a timing diagram that illustrates a sequential process that represents a n'th replication cycle of an asynchronous remote mirroring (denoted "replicating deltas n of a logical volume" 210) and a single replication cycle that involves (i) taking at Tn (200($n$)) an n'th point of time snapshot of a logical volume, which represents the state of the logical volume at the n'th point in time (ii) calculating the deltas between the n'th point of time content of the logical volume and the (n−1)'th point in time content of the logical volume. The deltas includes data and metadata (e.g., logical addresses) of the changed areas; and (iii) transmitting these deltas in a sequential manner to a remote site. The process starts at the n'th point in time T(n) 200($n$) and ends at the (n+1)'th point in time T(n+1) 200($n$+1).

The remote site stores the deltas in a mirrored logical volume and acknowledges the reception of the deltas and the creation of a n'th point in time replicate snapshot of the mirrored logical volume at the remote site. After acknowledging the completion, the next replication cycle can start.

Only if all of the n'th point of time deltas of the entire logical volume are successfully received (and all preceding point of time deltas of the entire logical volume are successfully received) and processed by the remote site, then the n'th point in time content of the logical volume can be reconstructed by the remote site.

There is a growing need to speed up the remote mirroring process.

SUMMARY

According to an embodiment of the invention various methods may be provided and are described in the specification. According to various embodiments of the invention there may be provided a non-transitory computer readable medium that may store instructions for performing any of the methods described in the specification and any steps thereof, including any combinations of same. Additional embodiments of the invention include a storage system arranged to execute any or all of the methods described in the specification above, including any stages—and any combinations of same.

According to an embodiment of the invention there may be provided a method for generating remote replicates of a logical volume at a remote site, the method comprises performing a plurality of replication cycles for generating a plurality (N) of points in time replicates of the logical volume at the remote site; wherein for each positive integer n that ranges between 2 and N, a performing of a n'th replication cycle comprises: calculating in parallel and by multiple computerized resources of a storage system, multiple n'th point in time differences of multiple subsets of the logical volume; wherein n'th point in time differences of different subsets are calculated by different computerized resources; wherein a n'th point in time difference of a subset is a difference between an (n−1)'th point in time content of the subset and an n'th point in time content of the subset; and sending, in parallel, the multiple n'th point in time differences to the remote site.

The calculating of the multiple n'th point in time differences may be executed after a completion of a reception, by the remote site, of all (n−1)'th point in time differences between (n−2)'th point in time contents of the multiple subsets and the (n−1)'th point in time contents of the multiple subsets.

The calculating of a n'th point in time difference of a certain subset of the multiple subsets may be executed after a completion of a reception, by the remote site, of a (n−1)'th point in time difference of the certain subset and before a completion of calculation of all (n−1)'th point in time differences between (n−2)'th point in time contents of the multiple subsets and the (n−1)'th point in time contents of the multiple subsets.

The calculating, in parallel and by the multiple computerized resources of a storage system, of the multiple n'th point in time differences may be preceded by creating an n'th point of time snapshot of the logical volume.

The calculating, in parallel and by the multiple computerized resources of a storage system, of the multiple n'th point in time differences may be preceded by creating multiple n'th point of time snapshots of the multiple subsets of the logical volume.

The method may include sending to the remote site an indication of a boundary of each one of the n'th point of time differences.

The difference between the n'th point in time and the (n−1)'th point in time may be below a second.

The method may include determining the n'th point in time in response to a progress of an (n−1)'th replication cycle.

The method may include determining the n'th point in time to occur before calculating any (n+1)'th point in time difference of any subset of the logical volume.

The method may include determining the n'th point in time in response to (a) a progress of an (n−1)'th point in time replication cycle and to (b) timing restrictions reflecting a desired relationship between points of time of different replication cycles.

The method may include determining the n'th point in time to occur (a) after a completion of a transfer to the remote site of at least one (n−1)'th point in time difference of at least one subset and (b) before a completion of a transfer to the remote site of (n−1)'th point in time differences of all of the multiple subsets.

The multiple computerized resources of the storage system may be are responsible to manage the multiple subsets.

The multiple subsets of the logical volume may form the logical volume.

The method may include receiving from the remote site information for reconstructing a last point in time content of the logical volume for which the remote site successfully received point in time differences of all of the subsets of the logical volume.

According to an embodiment of the invention there may be provided a non-transitory computer readable medium that stores instructions that once executed by a computer cause the computer to execute the stags of may include performing multiple replication cycles for generating multiple (N) points in time replicates of a logical volume at the remote site; wherein for each positive integer n that ranges between 2 and N, a performing of a n'th replication cycle may include calculating in parallel and by multiple computerized resources of a storage system, multiple n'th point in time differences of multiple subsets of the logical volume; wherein n'th point in time differences of different subsets are calculated by different computerized resources; wherein a n'th point in time difference of a subset may be a difference between an (n−1)'th point in time content of the subset and an n'th point in time content of the subset; and sending, in parallel, the multiple n'th point in time differences to the remote site.

According to an embodiment of the invention there may be provided a storage system that may include multiple computerized resources and an interface; wherein the multiple computerized resources are arranged to perform a plurality of replication cycles for generating a plurality (N) of points in time replicates of the logical volume at the remote site; wherein for each positive integer n that ranges between 2 and N, the multiple computerized systems are arranged to perform a n'th replication cycle that may include calculating in parallel and by the multiple computerized resources, multiple n'th point in time differences of multiple subsets of the logical volume; wherein n'th point in time differences of different subsets are calculated by different computerized resources; wherein a n'th point in time difference of a subset may be a difference between an (n−1)'th point in time content of the subset and an n'th point in time content of the subset; and wherein the interface may be arranged to send, in parallel, the multiple n'th point in time differences to the remote site.

According to an embodiment of the invention there may be provided a method for restoring a logical volume, the method may include receiving at a remote site and during a plurality of replication cycles information for generating a plurality (N) of points in time replicates of the logical volume; wherein for each positive integer n that ranges between 2 and N, a performing of a n'th replication cycle may include receiving, in parallel, multiple n'th point in time differences of multiple subsets of the logical volume; wherein the multiple n'th point in time differences were calculated in parallel by multiple computerized resources of a storage system, wherein n'th point in time differences of different subsets were calculated by different computerized resources; wherein a n'th point in time difference of a subset may be a difference between an (n−1)'th point in time content of the subset and an n'th point in time content of the subset; and creating by multiple computerized resources of the remote site a n'th point in time snapshot of the logical volume in response to the multiple n'th point in time differences of multiple subsets of the logical volume.

The method may include receiving a request from the storage system to reconstruct the logical volume; searching information that facilitates a reconstruction of the entire logical volume at a certain point in time and ignoring information that facilitates reconstruction of only a part of a content of the entire logical volume.

The creating of the n'th point in time snapshot of the logical volume may include creating n'th point in time snapshots of subsets of the logical volume by the multiple computerized resources of the remote site; wherein an n'th point in time snapshot of a subset may be created by a computerized resource of the remote site allocated to the subset.

The method may include creating n'th point in time snapshots of different subsets of the logical volume at different points in time.

According to an embodiment of the invention there may be provided a storage system, may include an interface and multiple computerized resources; wherein the interface may be arranged to receive during a plurality of replication cycles information for generating a plurality (N) of points in time replicates of the logical volume; wherein for each positive integer n that ranges between 2 and N, the interface may be arranged to receive, in parallel, multiple n'th point in time differences of multiple subsets of the logical volume; wherein the multiple n'th point in time differences were calculated in parallel by multiple computerized resources of a storage system, wherein n'th point in time differences of different subsets were calculated by different computerized resources; wherein a n'th point in time difference of a subset may be a difference between an (n−1)'th point in time content of the subset and an n'th point in time content of the subset; and wherein the multiple computerized resources area arranged to create an n'th point in time snapshot of the logical volume in response to the multiple n'th point in time differences of multiple subsets of the logical volume.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
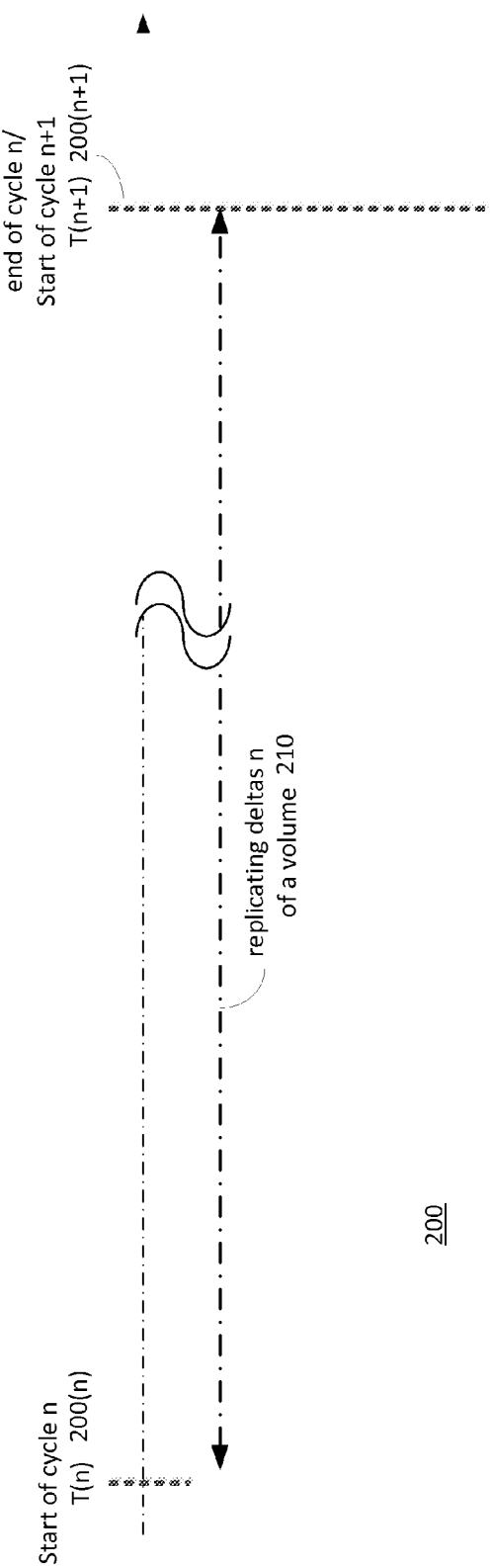
FIG. 1 is a prior art timing diagram that illustrates a replication of an entire logical volume and a sequential transmission of deltas relating to the entire logical volume.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There are provided, systems, methods and non-transitory computer readable media for performing parallel replications of subsets of a logical volume. These replications are managed by separate computerized resources of the storage system. According to an embodiment of the invention the different computerized resources can manage the replication independently from each other.

A computerized resource is a part of a computerized system that can be used to perform operations. A computerized resource can be a part of a storage system, a part of a control layer of a storage system, a server, a computer, a part of a server, a part of a computer, one or more general purpose processor, one or more controller, and the like.

Figure 2:
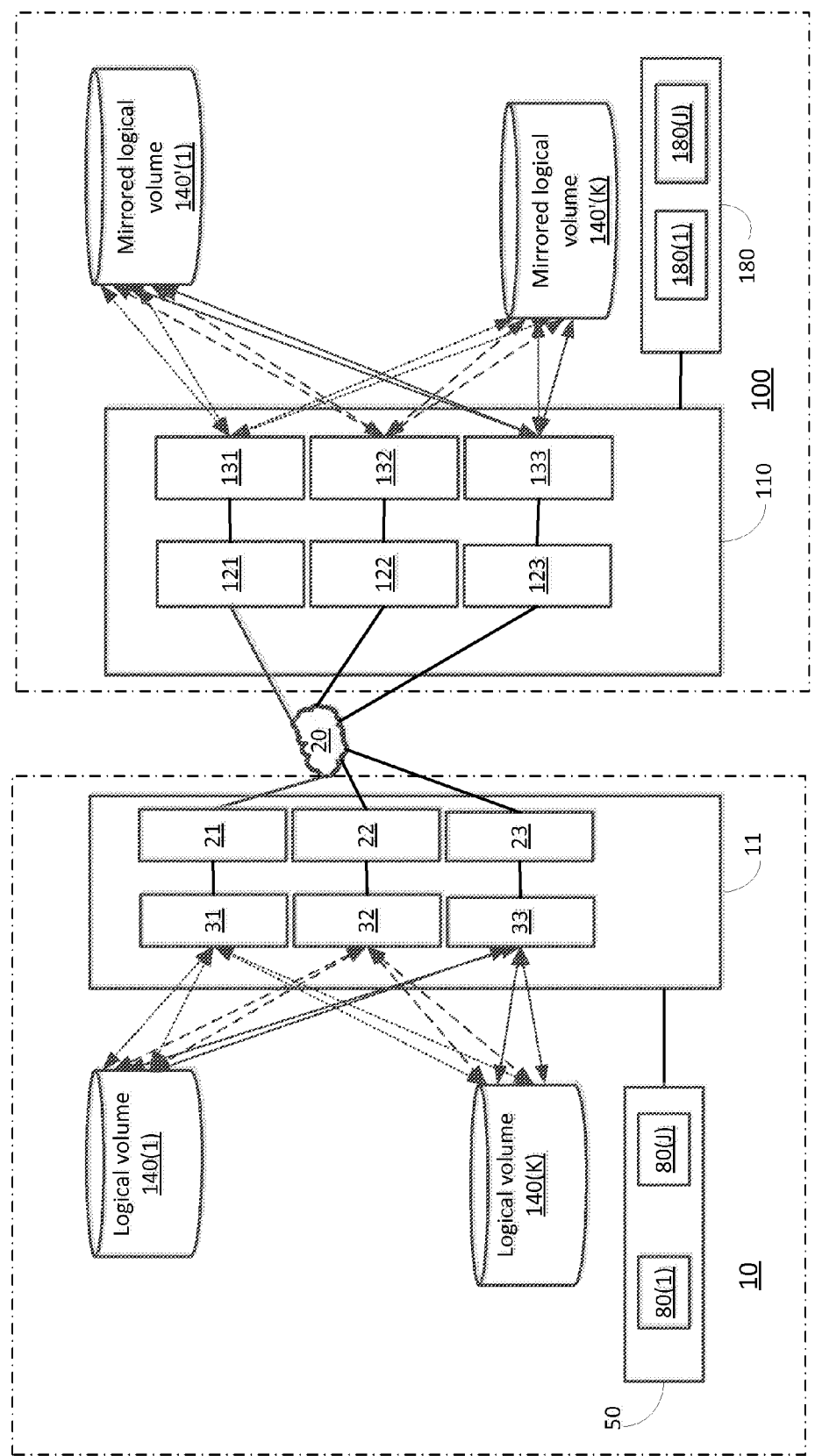
FIG. 2 illustrates a storage system, a remote site, logical volumes maintained by the remote site and the storage unit and their environment according to an embodiment of the invention.

FIG. 2 illustrates a storage system 10, a remote site 100, mirrored logical volumes 140'(1)-140'(K) maintained by the remote site 100, logical volumes 140(1)-140(K) maintained by the storage system 10 and their environment according to an embodiment of the invention. K is a positive integer and may exceed one.

The storage system 10 is coupled over a network 20 to the remote site 100. The remote site 100 is illustrated as being a remote storage system that may be spaced apart from the so called "local" storage system 10.

It is noted that the remote site 100 can be included in the storage unit 10 but usually it is located at a different location from the location of the storage system 10.

Storage system 10 includes a local control layer 11 and a permanent storage layer 50. The permanent storage layer 50 includes hard disks 50(1)-50(J) or other equivalent non-volatile storage units. J is a positive integer and may exceed one. The local control layer 11 is arranged to manage the storage system 10. It may include one or more cache units (not shown) for caching data before the data is being destaged to the permanent storage layer. The permanent storage layer 80 supports a physical address space. The local control layer 11 manages the permanent storage layer and maps the physical address space to a logical address space accessible to host computers (not shown) that may access the data stored in the storage system 10.

Remote site (such as remote storage system) 100 includes a remote control layer 110 and a permanent storage layer 180. The permanent storage layer 180 includes hard disks 180(1)-180(J) or other equivalent non-volatile storage units. The remote control layer 110 is arranged to manage the remote site 100. It may include one or more cache units (not shown) for caching data before the data is being destaged to the permanent storage layer. The permanent storage layer 180 supports a physical address space of remote site 100. The remote control layer 110 manages the permanent storage layer and maps the physical address space to a logical address space accessible to host computers (not shown) that may access the data stored in the remote site 100, either directly or via storage system 10.

FIG. 2 illustrates logical volumes 140(1)-140(K). These are virtual entities that are mapped to physical addresses of the physical address space maintained by the permanent storage layer 50.

FIG. 2 also illustrates mirrored logical volumes 140'(1)-140'(K). These are virtual entities that are mapped to physical addresses of the physical address space maintained by the permanent storage layer 150.

Different subsets of each logical volume and their replications are managed by different computerized resources. FIG. 2 illustrates three computerized resources and three communication paths per storage system but the number of computerized resources and communication paths may differ from three.

Furthermore, the different subsets that are managed by different computerized resources may be of the same size or may differ from each other by size. The allocation of subsets to computerized resources may be the same or may differ from one logical volume to the other.

A plurality of computerized resources 31, 32, 33 and a plurality of communication paths 21, 22, 23 of storage system 10 may be used for replicating in parallel a plurality of subsets of logical volumes 140(1)-140(K). The replicating includes generating the deltas and sending them to the remote site.

A replication of a subset is deemed to end once the storage system receives an acknowledgement from the remote site, the acknowledgement is indicative that the deltas were received by the remote site and that the remote site already generated a replicate of the content of the subset (or has received enough information and safely saved the information so as to generate such a replicate).

Computerized resource 31 and communication path 21 are used for replicating subsets that differ from the subsets replicated by computerized resource 32 and communication path 22 and from the subsets replicated by computerized resource 33 and communication path 33.

A plurality of computerized resources 131, 132, 133 and a plurality of communication paths 121, 122, 123 of remote site 100 may be used for participating in managing the different subsets of mirrored logical volumes 140'(1)-140' (K) to provide replications of the logical volumes 140(1)-140(K) at multiple points in time.

Computerized resource 131 are used for managing deltas of subsets that differ from the deltas of subsets managed by computerized resource 132 and both differ from the deltas of subsets managed by computerized resource 133.

It is noted that the number of computerized resources may differ from the number of communication paths or may be equal to the number of communication paths. The number of computerized resources and the number of communication paths may differ from three. The number of computerized resources at storage system 10 may differ from the number of computerized resources at remote site 100.

For simplicity of explanation some of the following text will refer to the computerized resources as servers.

Figure 3:
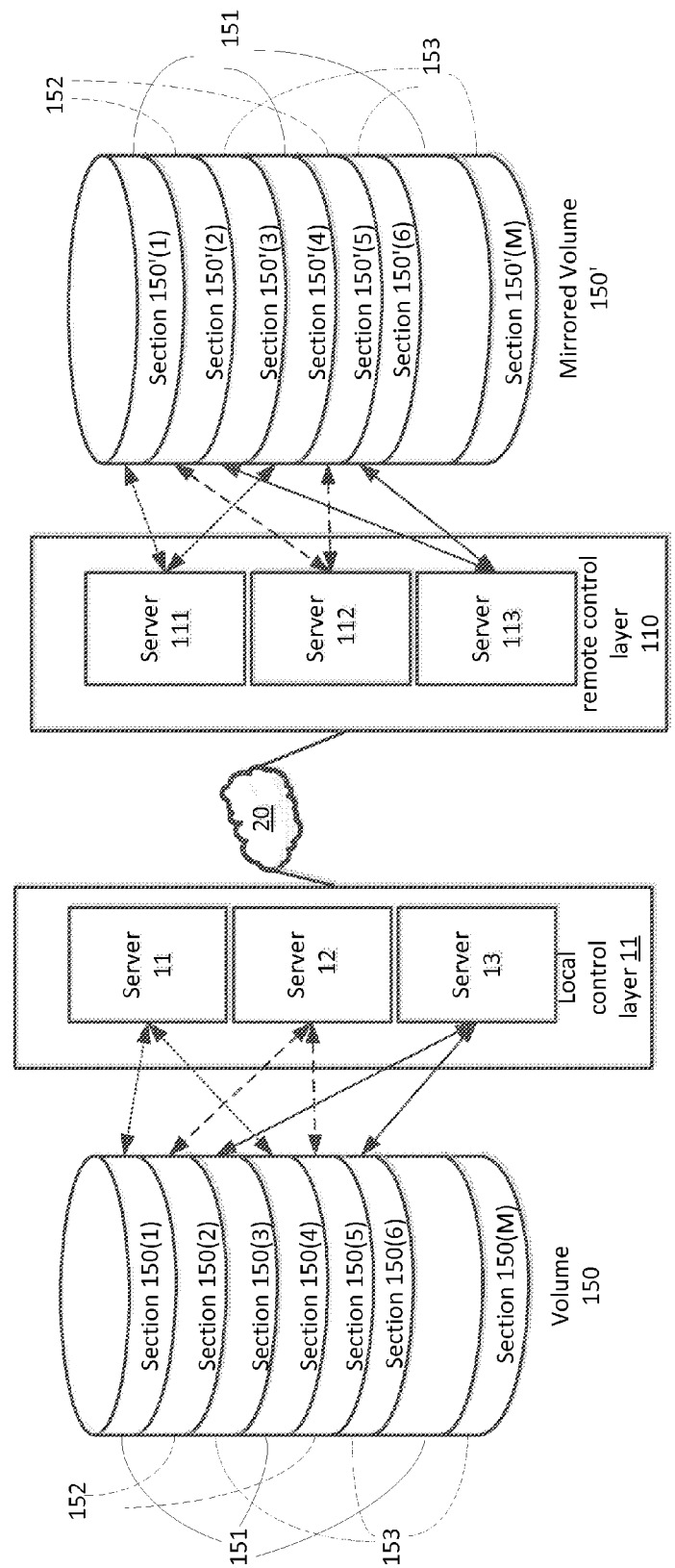
FIG. 3 illustrates a local control layer of the storage system, a remote control layer of the remote site, a logical volume maintained by the remote site, a logical volume maintained by the storage unit and their environment according to an embodiment of the invention.

FIG. 3 illustrates the local control layer 11 of the storage system 10, the remote control layer 110 of the remote site 100, a mirrored volume 150' maintained by the remote site 100, a logical volume 100 maintained by the storage system 10 and their environment according to an embodiment.

FIG. 3 illustrates computerized resources that are servers—servers 11, 12 and 13 of storage system 10 and servers 111, 112 and 113 of remote site 100.

In storage system 10 the responsibility for handling each logical volume (such as logical volume 150), and particularly the responsibility for replicating the logical volume to a remote mirrored volume is split between a plurality of computerized resources such as servers 11, 12 and 13. The logical volume 150 can be viewed as a plurality of subsets, each subset is under a responsibility of one of the plurality of servers.

Each data unit (section, for example of length of 64K) in the volume is under a responsibility of one of the servers. Multiple sections form a subset. If, for example, there are S computerized resources and there are M sections per logical volume then each computerized resource can manage M/S (Q) sections.

For example, in FIG. 3, server 11 is responsible for handling a subset 151 of sections that includes (M/3) sections such as sections 150(1), 150(4), and so on, so that a third of the sections are under the responsibility of server 11.

Server 12 is responsible for handling a subset 152 of sections that includes (M/3) sections such as sections 150 (2), 150(5), and so on, so that another third of the sections are under the responsibility of server 12.

Server 13 is responsible for handling a subset 153 of sections that includes (M/3) sections such as sections 150 (3), 150(6), and so on (for example—till 150(M)), so that another third of the sections are under the responsibility of server 13.

The remote mirroring of a logical volume can be executed by performing multiple (N) replication cycles to provide N point in time replicates of the logical volume. N being a positive integer.

During a n'th replication cycle (n ranges between 1 and N) the computerized resources of the local storage system (i) create a n'th point in time snapshot of the logical volume, (ii) compare a content of the n'th point in time snapshot of the logical volume to a content of the (n−1)'th point in time snapshot (which is the last snapshot created before the n'th point in time snapshot) to find n'th point in time differences (deltas) for each of the subsets of the logical volume, and (iii) transmit the n'th point in time deltas to the remote site. The deltas can be transmitted in one or multiple messages.

The local storage system can notify the remote site that the n'th replication cycle ended for a certain subset, as part of the last message of deltas of that subset.

Alternatively or additionally, the local storage system can notify the remote site about a new replication cycle, as part of the first message of deltas of the subset. The notification of a new replication cycle implies that the previous replication cycle is terminated.

During the n'th replication cycle the remote storage system (i) receives the deltas, (ii) stores the deltas in a mirrored logical volume, (iii) upon notification of a replication cycle termination for a certain subset, takes a snapshot of the certain subset. Once the snapshot of the certain subset is taken, the computerized resources of the remote site that handle the certain subset can start handling the deltas of the next cycle.

The time interval between replication cycles can be very short, a typical interval can be a second or even a fraction of a second—for example it may ranges between one or more microns and one or more milliseconds.

Figure 4:
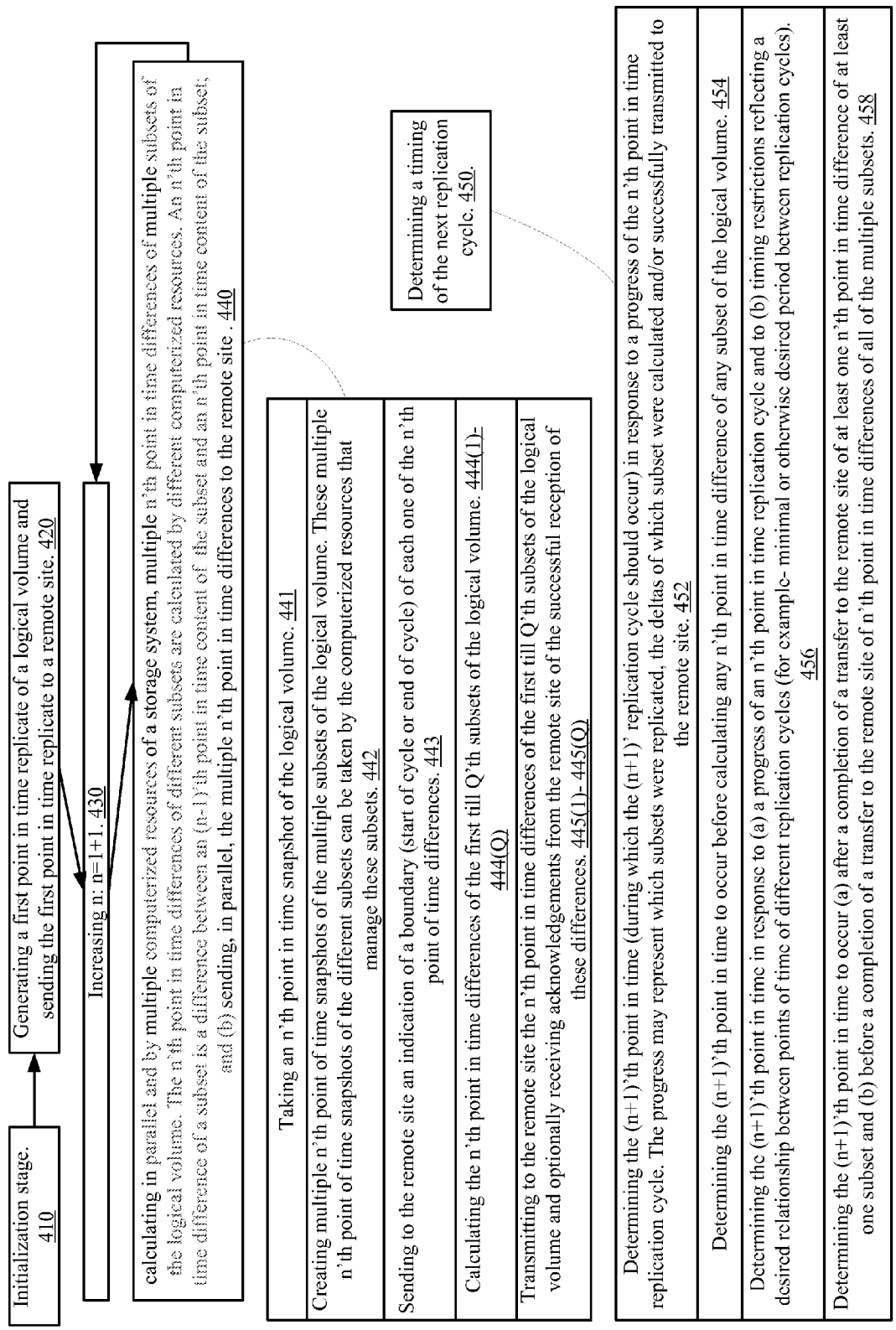
FIG. 4 illustrates a method according to an embodiment of the invention.

FIG. 4 illustrates method 400 for generating remote replicates of a logical volume according to an embodiment of the invention.

Method 400 can be executed for each logical volume that should be remote mirrored. This may involve generating remote replicates to all or some of the logical volumes maintain by a local storage system.

Method 400 starts by initialization stage 410. This stage may include receiving information about the partition of subsets to computerized resources, about desired time for taking snapshots and replicating differences between adjacent snapshots and the like. Stage 410 also includes setting index n to 1.

Stage 410 is followed by stage 420 of generating a first point in time replicate of a logical volume. This may include creating a first point in time snapshot of the logical volume and sending the initial content of the logical volume as reflected by the first point in time snapshot to a remote site.

Stage 420 is followed by stage 430 of increasing n: n=1+1.

Stage 430 may be followed by stage 440 of (a) calculating in parallel and by multiple computerized resources of a storage system, multiple n'th point in time differences of multiple subsets of the logical volume. The n'th point in time differences of different subsets are calculated by different computerized resources. An n'th point in time difference of a subset is a difference between an (n−1)'th point in time content of the subset and an n'th point in time content of the subset; and (b) sending, in parallel, the multiple n'th point in time differences to the remote site.

The sending may be performed over one or more communication paths. If there are more subsets than communication paths then any type of multiplexing (for example statistical multiplexing) can be applied Stage 440 may include stage 441 of taking an n'th point in time snapshot of the logical volume.

Alternatively, stage 440 may include stage 442 of creating multiple n'th point of time snapshots of the multiple subsets of the logical volume. These multiple n'th point of time snapshots of the different subsets can be taken by the computerized resources that manage these subsets.

Stage 400 may include stage 443 of sending to the remote site an indication of a boundary (start of cycle or end of cycle) of each one of the n'th point of time differences.

Method 400 may also include stage 450 of determining a timing of the next replication cycle. In this case the method progresses from stage 440 to stage 430 according to the timing determined by stage 450.

Figure 5:
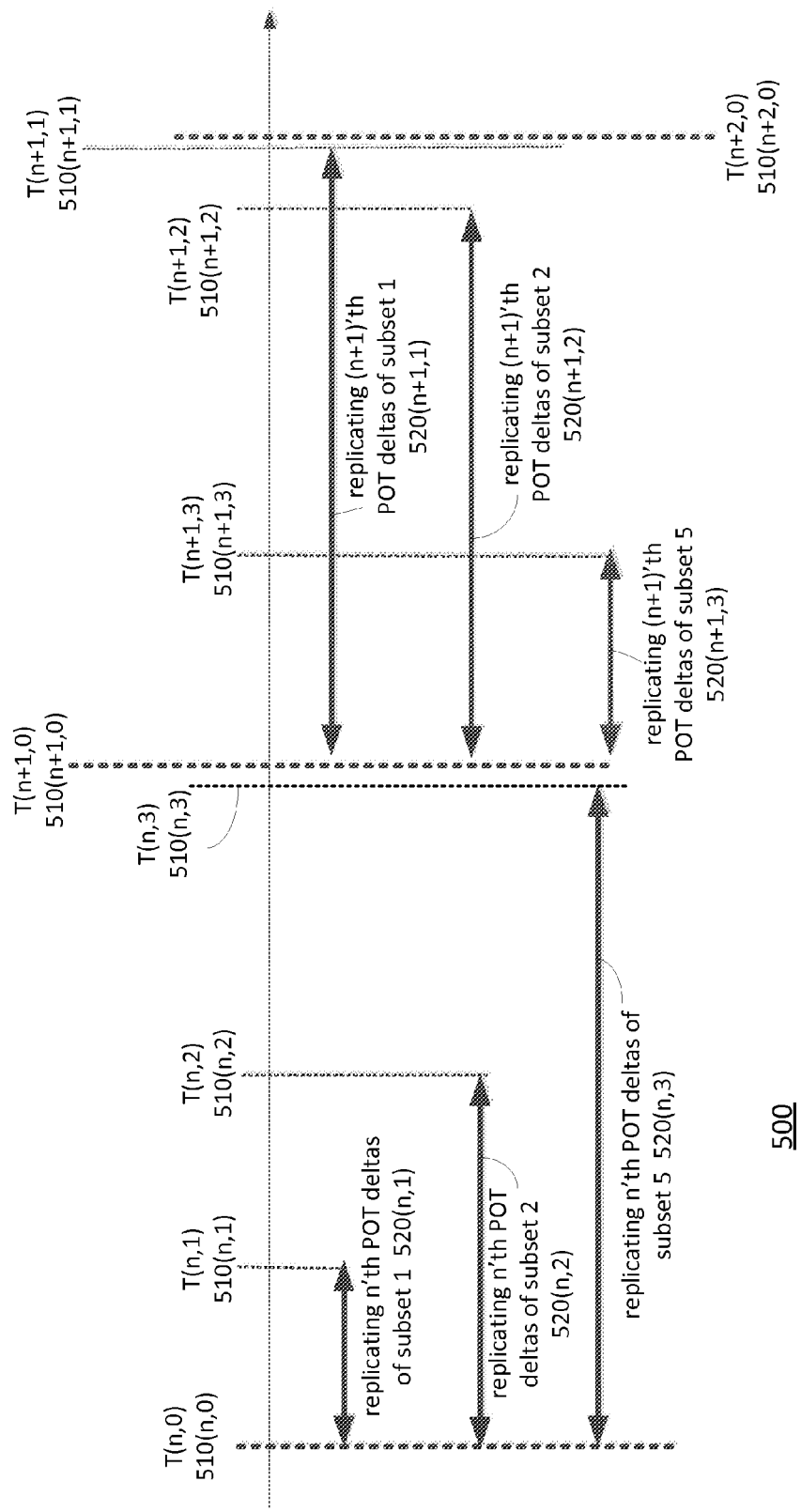
FIG. 5 a timing diagram that illustrates a parallel replication of deltas of different subsets of a logical volume according to an embodiment of the invention.

FIG. 5 is a timing diagram 300 according to an embodiment of the invention. For simplicity of explanation it is assumed that at the n'th replication cycle the replication of different subsets starts simultaneously. It is further assumed that the logical volume that is replicated has three subsets—subset1, subset2 and subset3.

Table 1 illustrates the following events that are illustrated by timing diagram 500, according to their order:

TABLE 1

| Point in time | |
|---|---|
| T(n,0) 510(n,0) | Start of n'th replication cycle, taking an n'th point in time snapshot of the logical volume |
| T(n,1) 510(n,1) | End of replication of n'th point in time deltas of subset1. |
| T(n,2) 510(n,2) | End of replication of n'th point in time deltas of subset2 |
| T(n,3) 510(n,3) | End of replication of n'th point in time deltas of subset3 |
| T(n + 1,0) 510(n + 1,0) | Start of (n + 1)'th replication cycle, taking an (n + 1)'th point in time snapshot of the logical volume |
| T(n + 1,1) 510(n + 1,1) | End of replication of (n + 1)'th point in time deltas of subset1 |
| T(n + 1,2) 510(n + 1,2) | End of replication of (n + 1)'th point in time deltas of subset2 |
| T(n + 1,3) 510(n + 1,3) | End of replication of (n + 1)'th point in time deltas of subset3 |
| T(n + 2,0) 510(n + 2,0) | Start of (n + 2)'th replication cycle, taking an (n + 2)'th point in time snapshot of the logical volume |

It is noted that a replication of a subsets ends after receiving by the storage system an acknowledgement of its reception by the remote site.

It is noted that a replication of one subset of the logical volume can be executed even if one or more other subset was not replicated yet.

Referring to FIG. 4—the sending of n'th point in time differences of a certain subset can be executed before all the n'th point in time differences are calculated and/or sent to the remote site.

Accordingly, assuming that there are Q subsets (for example and referring to FIG. 2 Q=M/3) then stage 440 may include:

A. Stages 444(1)-444(Q) of calculating the n'th point in time differences of the first till Q'th subsets of the logical volume.

B. Stages 445(1)-445(Q) of transmitting to the remote site the n'th point in time differences of the first till Q'th subsets of the logical volume and optionally receiving acknowledgements from the remote site of the successful reception of these differences.

Stages 444(1)-444(Q) can be executed in parallel or partially in parallel to each other. Stages 445(1)-445(Q) can be executed in parallel or partially in parallel to each other. Stages 444 can be executed in parallel to stages 445.

It is noted that for each value of index q that ranges between 1 and Q stage 444(q) is followed by a completion of stage 445(q) and that the execution of a next replication cycle (n+1) of each subset can start even if the replication of all other subsets is not completed.

Accordingly, calculating of a n'th point in time difference of a certain subset of the multiple subsets may be executed after a completion of a reception, by the remote site, of a (n−1)'th point in time difference of the certain subset and before a completion of calculation of all (n−1)'th point in time differences between (n−2)'th point in time contents of the other multiple subsets (not including the certain subset) and the (n−1)'th point in time contents of the other multiple subsets.

Stage 450 may include determining (stage 452) the (n+1)'th point in time (during which the (n+1)'th replication cycle should occur) in response to a progress of the n'th point in time replication cycle. The progress may represent which subsets were replicated, the deltas of which subset were calculated and/or successfully transmitted to the remote site.

Stage 450 may include determining (stage 454) the (n+1)'th point in time to occur before calculating any (n+1)'th point in time difference of any subset of the logical volume.

Stage 450 may include determining the (n+1)'th point in time in response to (a) a progress of an n'th point in time replication cycle and to (b) timing restrictions reflecting a desired relationship between points of time of different replication cycles (for example—minimal or otherwise desired period between replication cycles).

Stage 450 may include determining (stage 456) the (n+1)'th point in time to occur (a) after a completion of a transfer to the remote site of at least one n'th point in time difference of at least one subset and (b) before a completion of a transfer to the remote site of n'th point in time differences of all of the other subsets.

The (n+1)'th point of time snapshot may occur after at least one n'th point of tiem snapshot of a subset is obtained at the remote site.

Figure 6:
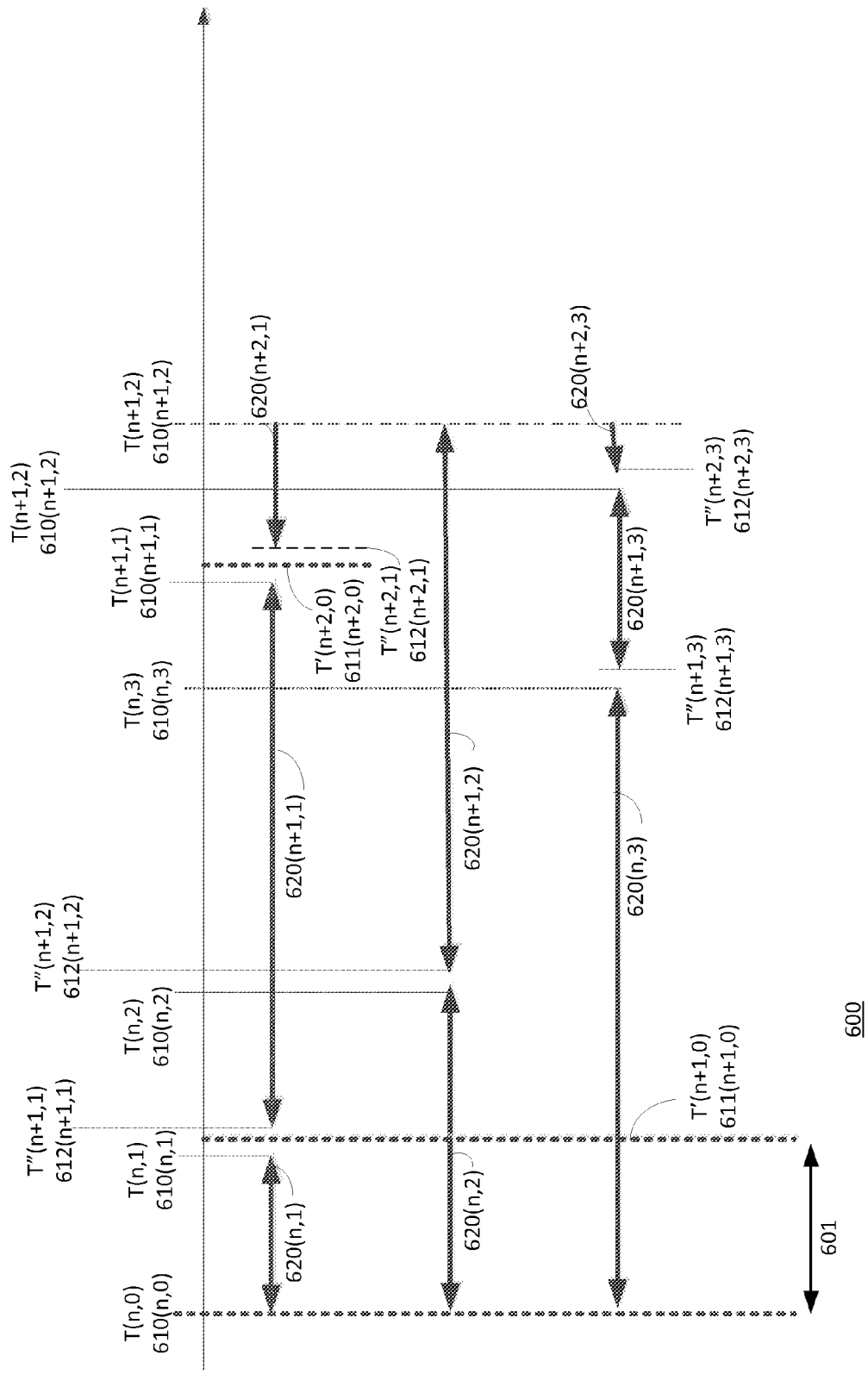
FIG. 6 a timing diagram that illustrates a parallel replication of deltas of different subsets of a logical volume according to an embodiment of the invention.

FIG. 6 is a timing diagram 600 according to an embodiment of the invention. For simplicity of explanation it is assumed that at T(n,0) 610(n,0), the replication of different subsets starts simultaneously. It is further assumed that the logical volume that is replicated has three subsets—subset1, subset2 and subset3.

Table 2 illustrates the following events that are illustrated by timing diagram 600, according to their order:

TABLE 2

| Point in time | |
|---|---|
| T(n,0) 610(n,0) | Taking an n'th point in time snapshot of the logical volume. Starting calculation of n'th point in time deltas of all subsets. |
| T(n,1) 610(n,1) | End of replication of n'th point in time deltas of subset1 |
| T'(n + 1,0) 611(n + 1,0) | Taking an (n + 1)'th point in time snapshot of the logical volume |
| T"(n + 1,1) 612(n + 1,1) | Starting replicating an (n + 1)'th point in time deltas of subset1 |
| T(n,2) 610(n,2) | End of replication of n'th point in time deltas of subset2 |
| T"(n + 1,2) 612(n + 1,2) | Starting replicating an (n + 1)'th point in time deltas of subset2 |
| T(n,3) 610(n,3) | End of replication of n'th point in time deltas |

TABLE 2-continued

| Point in time | |
|---|---|
| | of subset3 |
| T"(n + 1,3) 612(n + 1,3) | Starting replicating an (n + 1)'th point in time deltas of subset3 |
| T(n + 1,1) 610(n + 1,1) | End of replication of (n + 1)'th point in time deltas of subset 1 |
| T'(n + 2,0) 611(n + 2,0) | Taking an (n + 2)'th point in time snapshot of the logical volume |
| T"(n + 2,1) 612(n + 2,1) | Starting replicating an (n + 2)'th point in time deltas of subset1 |
| T"(n + 1,3) 612(n + 1,3) | Starting replicating an (n + 1)'th point in time deltas of subset3 |
| T(n + 1,2) 610(n + 1,2) | End of replication of (n + 1)'th point in time deltas of subset2 |

FIG. 6 and table 2 illustrates that a snapshot is taken immediately after the previous point of time replication of a single subset is completed. It is noted that the snapshot can be taken in view of additional parameters/constraints—such as desired time difference between snapshots. FIG. 6 illustrates that the (n+1)'th point in time snapshot can be taken only after a minimal desired period 601 between snapshots lapses.

Although according to the example described above, the next point in time snapshot of the logical volume (or next point in time snapshots of subsets of the logical volume) is taken upon completion of the replication of one subset, this next point in time snapshot (of snapshots), can be taken by the storage system at any other time during the cycle, but before start sending deltas of the next point in time of any of the subsets to the remote site. For example, the storage system may determine that snapshots are taken in intervals that are not smaller than a certain value, e.g., 1 second. Suppose the first subset completes the replication after 500 milliseconds, the next snapshot will be delayed by another 500 milliseconds (the computerized resources of the first subset are idle during this time) and only after the 1 second elapses, the next point in time snapshot of logical volume can be taken and the next point in time deltas of the first subset are replicated. Thus the rule for when to start the next replication cycle (and when to take the next point in time snapshot) can be determined as the latest between: the time when the first subset completes the cycle and a minimum interval threshold (such as threshold 601 of FIG. 6).

Due to the time differences between the start and end of the replications of different subsets, the remote site can receive only some of the replications of the subsets of a certain cycle under process, when a failure occurs, either in the remote system or in the network connecting the remote system to the storage system. When the remote system performs a recovery process after the failure, it will be capable of restoring the content of the entire mirrored logical volume for the last point in time for which the remote site has all replicated subsets.

In order to be capable of restoring consistent content of the entire mirrored logical volume for a certain point in time (e.g., n), the remote site may takes n'th point in time snapshot of each replicated subset when the replication of n'th point in time of the subset is ended and indicated by a boundary notification received by the remote system from the storage system. For example, on T(n,1) 610($n$,1), the remote system takes n'th point in time snapshot for replicated subset1, on T(n,2) 610($n$,2), the remote system takes n'th point in time snapshot for replicated subset2, on T(n,3) 610($n$,3), the remote system takes n'th point in time snapshot for replicated subset3, on T(n+1,1) 610($n$+1,1), the remote system takes (n+1)'th point in time snapshot for replicated subset1, on T(n+1,2) 610($n$+1,2), the remote system takes (n+1)'th point in time snapshot for replicated subset2, and on T(n+1,3) 610($n$+1,3), the remote system takes (n+1)'th point in time snapshot for replicated subset3.

On T(n,3) 610($n$,3), the remote system has all snapshots of the replicated subsets for the n'th cycle, which compose the entire n'th snapshot of the mirrored volume. The n'th snapshot of the mirrored volume is an identical replication (and therefore, a consistent version) of the n'th snapshot of the logical volume.

Referring to FIG. 6—the n'th point in time content of the logical volume can be reconstructed by the remote site only after T(n,3) 610($n$,3) and assuming that the replications that preceded this point of time were successfully completed. If, for example, a failure occurred between T(n,0) and T(n,3) then up to the (n−1)'th point in time content of the logical volume can be reconstructed—assuming that the replications that preceded this point of time were successfully completed.

Referring to FIG. 6—the (n+1)'th point in time content of the logical volume can be reconstructed by the remote site only after T(n+1,2) 610($n$+1,2) and assuming that the replication that preceded this point of time were successfully completed.

If, for example, a failure occurred between T'(n+1,0) and T(n+1,2) then up to the n'th point in time content of the logical volume can be reconstructed—assuming that the replications that preceded this point of time were successfully completed.

Figure 7:
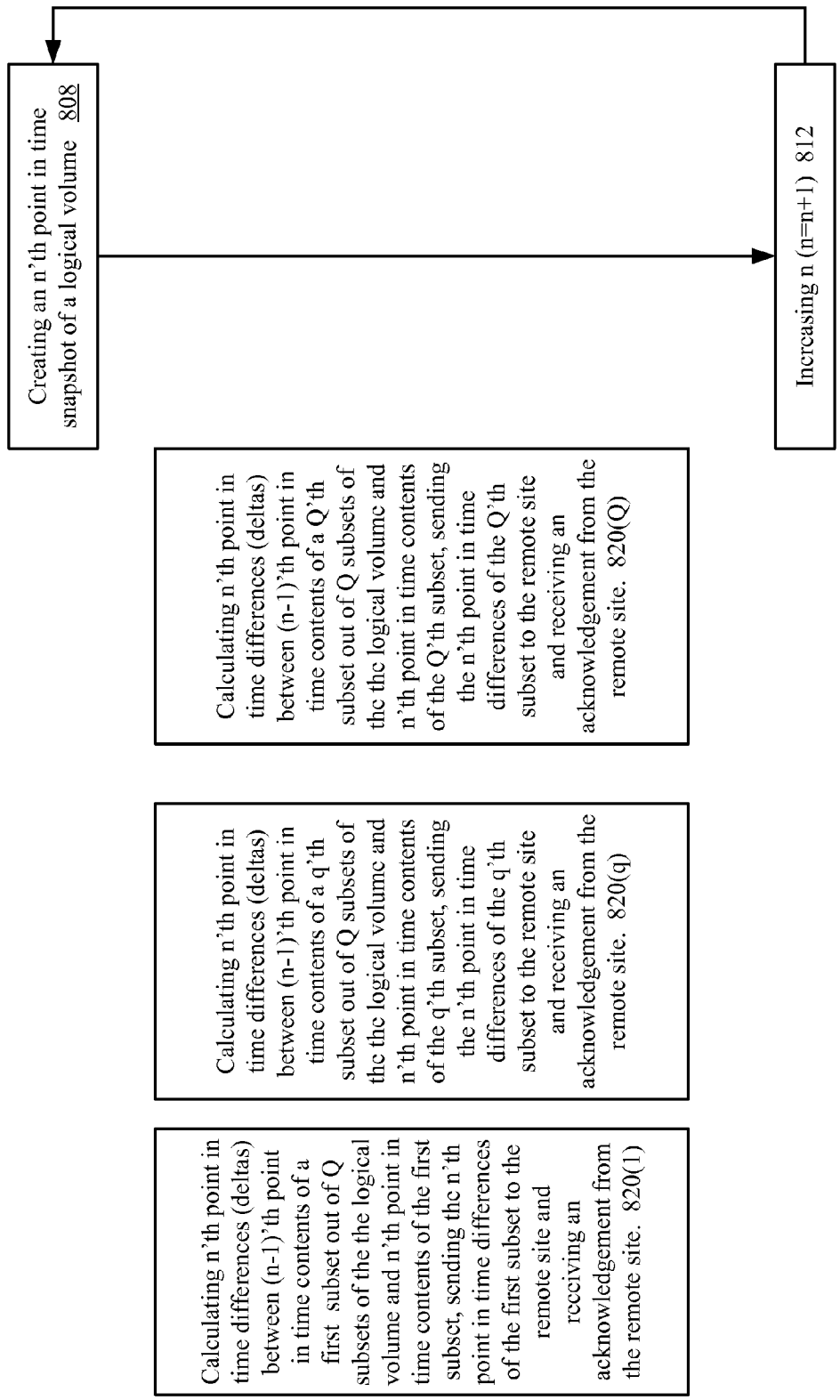
FIG. 7 illustrates a method according to an embodiment of the invention.

FIG. 7 illustrates method 800 according to an embodiment of the invention.

Method 800 includes a first sequence of stages that includes stages 808 and 812. It also includes Q sequences of stages—stages 820(1)-820(Q).

The first sequence of stages starts by stage 808 of creating a n'th point of time snapshot of a logical volume. This may include creating Q n'th point of time snapshots of the different (Q) subsets of that logical volume.

Stage 808 may be followed by stage 812 of increasing n (n=n+1). This indicates that the next replication cycle can start. Various examples of timing limitations were illustrated above (see, for example, stage 450 of FIG. 4).

Stage 812 is followed by stage 808.

For each value of n the method includes Q replication stages 820(1)-820(Q) are executed. The replication on one subset is not dependent upon the replication of another subset.

Stage 820(1) includes (i) calculating n'th point in time differences (deltas) between (n−1)'th point in time contents of a first subset out of Q subsets of the logical volume and n'th point in time contents of the first subset, (ii) sending the n'th point in time differences of the first subset to the remote site and (iii) receiving an acknowledgement from the remote site.

Stage 820(Q) includes (i) calculating n'th point in time differences (deltas) between (n−1)'th point in time contents of a Q'th subset out of Q subsets of the logical volume and n'th point in time contents of the Q'th subset, (ii) sending the n'th point in time differences of the Q'th subset to the remote site and (iii) receiving an acknowledgement from the remote site.

In general, for q ranging between 1 and Q stage 820($q$) includes (i) calculating n'th point in time differences (deltas) between (n−1)'th point in time contents of a q'th subset out of Q subsets of the logical volume and n'th point in time contents of the q'th subset, (ii) sending the n'th point in time differences of the q'th subset to the remote site and (iii) receiving an acknowledgement from the remote site.

Figure 8:
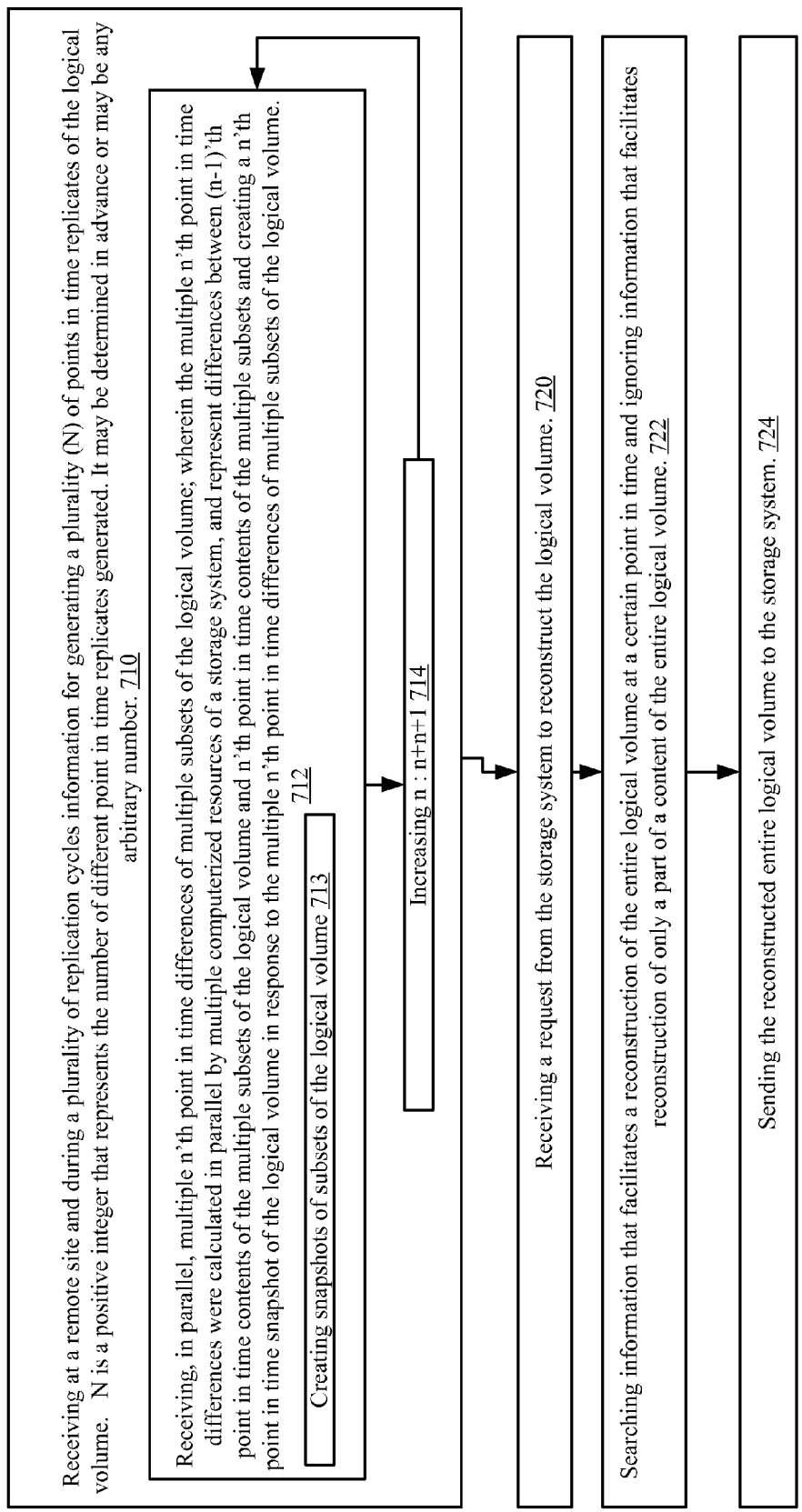
FIG. 8 illustrates a method according to an embodiment of the invention.

FIG. 8 illustrates method 700 for restoring a remote volume according to an embodiment of the invention.

Method 700 includes stage 710 of receiving at a remote site and during a plurality of replication cycles information for generating a plurality (N) of points in time replicates of the logical volume. N is a positive integer that represents the number of different point in time replicates generated. It may be determined in advance or may be any arbitrary number and may just keep growing.

Stage 710 starts by stage 712 of receiving, in parallel, multiple n'th point in time differences of multiple subsets of the logical volume; wherein the multiple n'th point in time differences were calculated in parallel by multiple computerized resources of a storage system, and represent differences between (n−1)'th point in time contents of the multiple subsets of the logical volume and n'th point in time contents of the multiple subsets and creating a n'th point in time snapshot of the logical volume in response to the multiple n'th point in time differences of multiple subsets of the logical volume.

Stage 712 may include creating snapshot of each subset of the multiple subsets of the logical volume when the subset is received by the computerized resource allocated to that subset—after the computerized resource is notified that it received all the relevant differences. Different computerized resources can create, at different points in time, the same point of time snapshots of different subsets.

Stage 712 may include receiving a notification of a boundary for each subset for indicating the end of the n'th point of time differences, wherein a n'th point in time snapshot for a subset is taken after receiving a boundary notification for the subset. The boundary notifications corresponding to different subsets for the n'th point in time can be received on different points in time.

Stage 712 is followed by stage 714 of increasing n:n+n+1 and jumping to stage 712. It is assumed that at a first cycle n equaled 1.

Stage 710 may be followed by stage 720 of receiving a request to reconstruct the mirrored logical volume. The request can be received from the storage system, or from a restart process within the remote site that is activated after failure, or from any recovery process within the remote site in case of any media failure, software failure or any other failure that damages the mirrored volume.

Stage 720 is followed by stage 722 of searching information that facilitates a reconstruction of the entire mirrored logical volume at a certain point in time and ignoring information that facilitates reconstruction of only a part of a content of the entire mirrored logical volume.

Stage 722 may include searching information that includes the latest point in time snapshot that was taken for each subset. Suppose, for example that the latest point in time for a first subset is (n−1), the latest point in time for a second subset is (n+1), and the latest point in time for a third subset is n.

The information that facilitates a reconstruction of the entire mirrored logical volume at a certain point in time is the most recent point in time for which snapshots exist for all subsets. In the above example, the (n−1)'th point in time is the most recent point in time that can be restored because a (n−1)'th point in time snapshot exists for all the subsets.

Information that facilitates reconstruction of only a part of a content of the entire logical volume corresponds to points in time for which only part of the subsets has snapshots, e.g., n and (n+1), for whom snapshots exists only to part of the subsets.

Stage 722 is followed by stage 724 of restoring the mirrored logical volume from the certain point in time snapshot and sending information indicative of a restored point in time content to the storage system.

The remote replication can now continue the remote replication, starting from a point in time that follows the restored point in time, e.g., starting from n'th point in time (that follows (n−1)'th point in time that was restored.

Figure 9:
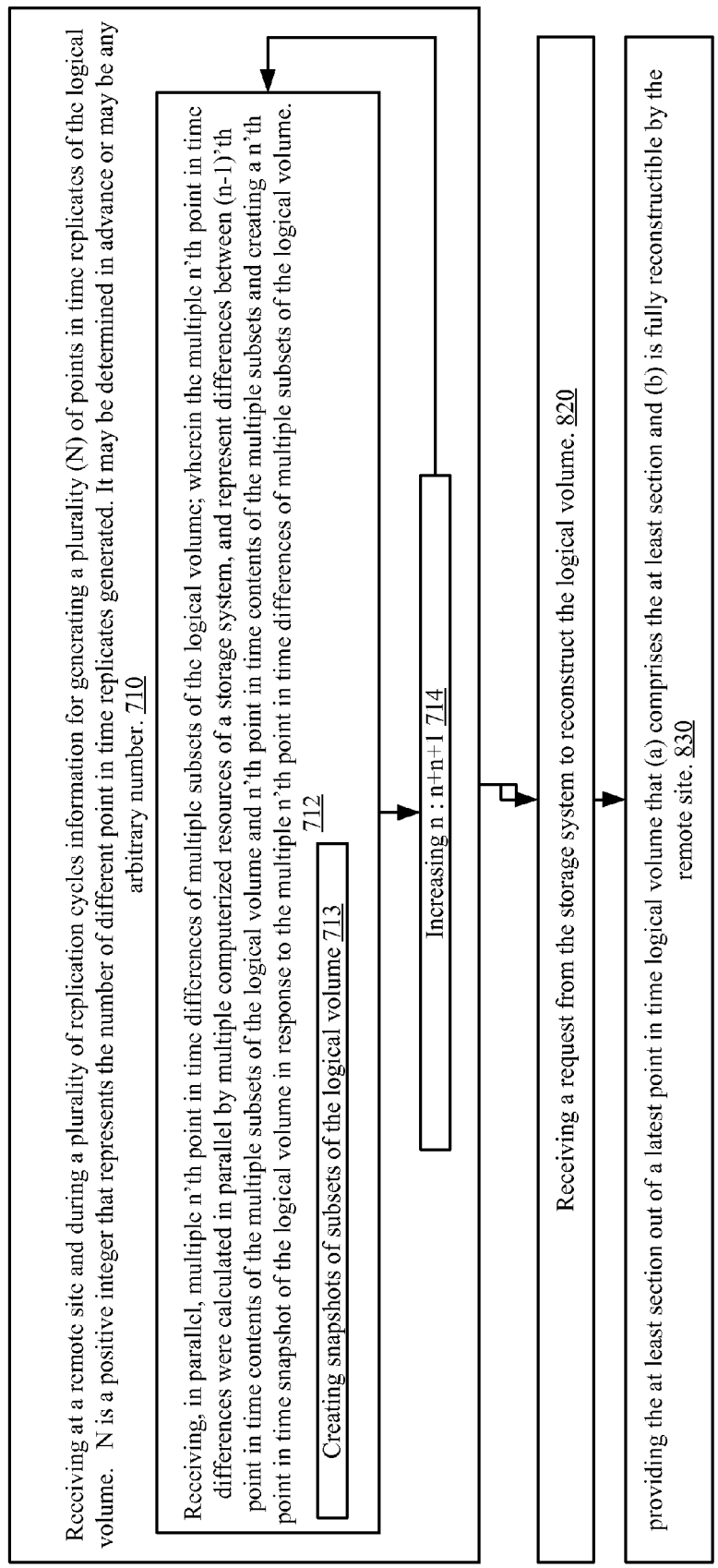
FIG. 9 illustrates a method according to an embodiment of the invention.

FIG. 9 illustrates method 800 for restoring a remote volume according to an embodiment of the invention.

Method 800 may start by stage 710 of receiving at a remote site and during a plurality of replication cycles information for generating a plurality (N) of points in time replicates of the logical volume. N is a positive integer that represents the number of different point in time replicates generated. It may be determined in advance or may be any arbitrary number and may just keep growing.

Stage 710 may also be followed by stage 820 of receiving a request (for example from the storage system) to receive at least a section of the logical volume.

Stage 820 may be followed by stage 830 of providing the at least section out of a latest point in time logical volume that (a) comprises the at least section and (b) is fully reconstructible by the remote site. Stage 820 may include ignoring information that facilitate a reconstruction of only a part of the logical volume.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for generating remote replicates of a logical volume at a remote site, the method comprises performing a plurality of replication cycles for generating a plurality (N) of points in time replicates of the logical volume at the remote site;
wherein for each positive integer n that ranges between 2 and N, a performing of a n'th replication cycle comprises:
calculating in parallel and by multiple processors of a storage system, multiple n'th point in time differences of multiple subsets of the logical volume;
wherein n'th point in time differences of different subsets of the logical volume are calculated by different processors;
wherein a n'th point in time difference of a subset is a difference between an (n−1)'th point in time content of the subset and an n'th point in time content of the subset; and
sending, in parallel, the multiple n'th point in time differences to the remote site; and
sending to the remote site an indication of a boundary of each one of the multiple n'th point of time differences.

2. The method according to claim 1 wherein the calculating of the multiple n'th point in time differences is executed after a completion of a reception, by the remote site, of all (n−1)'th point in time differences between (n−2)'th point in time contents of the multiple subsets and the (n−1)'th point in time contents of the multiple subsets.

3. The method according to claim 1 wherein a calculating of a n'th point in time difference of a certain subset of the multiple subsets is executed after a completion of a reception, by the remote site, of a (n−1)'th point in time difference of the certain subset and before a completion of calculation of all (n−1)'th point in time differences between (n−2)'th point in time contents of the multiple subsets and the (n−1)'th point in time contents of the multiple subsets.

4. The method according to claim 1 wherein the calculating, in parallel and by the multiple processors of a storage system, of the multiple n'th point in time differences is preceded by creating an n'th point of time snapshot of the logical volume.

5. The method according to claim 1 wherein the calculating, in parallel and by the multiple processors of a storage system, of the multiple n'th point in time differences is preceded by creating multiple n'th point of time snapshots of the multiple subsets of the logical volume.

6. The method according to claim 1 wherein a difference between the n'th point in time and the (n−1)'th point in time is below a second.

7. The method according to claim 1 comprising determining the n'th point in time in response to a progress of an (n−1)'th replication cycle.

8. The method according to claim 1 comprising determining the n'th point in time to occur before calculating any (n+1)'th point in time difference of any subset of the logical volume.

9. The method according to claim 1 comprising determining the n'th point in time in response to (a) a progress of an (n−1)'th point in time replication cycle and to (b) timing restrictions reflecting a desired relationship between points of time of different replication cycles.

10. The method according to claim 1 comprising determining the n'th point in time to occur (a) after a completion of a transfer to the remote site of at least one (n−1)'th point in time difference of at least one subset and (b) before a completion of a transfer to the remote site of (n−1)'th point in time differences of all of the multiple subsets.

11. The method according to claim 1 wherein the multiple processors of the storage system are responsible to manage the multiple subsets.

12. The method according to claim 1 wherein the multiple subsets of the logical volume form the logical volume.

13. The method according to claim 1 comprising receiving from the remote site information for reconstructing a last point in time content of the logical volume for which the remote site successfully received point in time differences of all of the subsets of the logical volume.

14. A non-transitory computer readable medium that stores instructions that once executed by a computer cause the computer to execute the stags of comprises performing multiple replication cycles for generating multiple (N) points in time replicates of a logical volume at the remote site;
wherein for each positive integer n that ranges between 2 and N, a performing of a n'th replication cycle comprises:
calculating in parallel and by multiple processors of a storage system, multiple n'th point in time differences of multiple subsets of the logical volume;
wherein n'th point in time differences of different subsets are calculated by different processors;
wherein a n'th point in time difference of a subset is a difference between an (n−1)'th point in time content of the subset and an n'th point in time content of the subset;
sending, in parallel, the multiple n'th point in time differences to the remote site; and
sending to the remote site an indication of a boundary of each one of the multiple n'th point of time differences.

15. A storage system that comprises multiple processors and an interface;
wherein the multiple processors are arranged to perform a plurality of replication cycles for generating a plurality (N) of points in time replicates of the logical volume at the remote site; wherein for each positive integer n that ranges between 2 and N, the multiple computerized systems are arranged to perform a n'th replication cycle that comprises: calculating in parallel and by the multiple processors, multiple n'th point in time differences of multiple subsets of the logical volume; wherein n'th point in time differences of different subsets are calculated by different processors; wherein a n'th point in time difference of a subset is a difference between an (n−1)'th point in time content of the subset and an n'th point in time content of the subset; and wherein the interface is arranged to send, in parallel, the multiple n'th point in time differences to the remote site, and is further arranged to send to the remote site an indication of a boundary of each one of the multiple n'th point of time differences.

16. A method for utilizing remote replicates of a logical volume, the method comprises:

receiving at a remote site and during a plurality of replication cycles information for generating a plurality (N) of points in time replicates of the logical volume; wherein for each positive integer n that ranges between 2 and N, a performing of a n'th replication cycle comprises:

receiving, in parallel, multiple n'th point in time differences of multiple subsets of the logical volume; wherein the multiple n'th point in time differences were calculated in parallel by multiple processors of a storage system, wherein n'th point in time differences of different subsets were calculated by different processors; wherein a n'th point in time difference of a subset is a difference between an (n−1)'th point in time content of the subset and an n'th point in time content of the subset;

receiving an indication of a boundary of each one of the multiple n'th point of time differences;

creating by multiple processors of the remote site a n'th point in time snapshot of the logical volume in response to the multiple n'th point in time differences of multiple subsets of the logical volume and to indications of boundaries of the multiple n'th point in time differences.

17. The method according to claim 16 comprising receiving a request from the storage system to receive at least a section of the logical volume; providing the at least section out of a latest point in time logical volume that comprises the at least section and is fully reconstructible by the remote site while ignoring information that facilitate a reconstruction of only a part of the logical volume.

18. The method according to claim 16 wherein the creating of the n'th point in time snapshot of the logical volume comprises creating n'th point in time snapshots of subsets of the logical volume by the multiple processors of the remote site; wherein an n'th point in time snapshot of a subset is created by a computerized resource of the remote site allocated to the subset.

19. The method according to claim 18 comprising creating n'th point in time snapshots of different subsets of the logical volume at different points in time.

20. A first storage system, comprising an interface and multiple processors; wherein the interface is arranged to receive during a plurality of replication cycles information for generating a plurality (N) of points in time replicates of the logical volume; wherein for each positive integer n that ranges between 2 and N, the interface is arranged to receive, in parallel, multiple n'th point in time differences of multiple subsets of the logical volume; wherein the multiple n'th point in time differences were calculated in parallel by multiple processors of a second storage system, wherein n'th point in time differences of different subsets were calculated by different processors; wherein a n'th point in time difference of a subset is a difference between an (n−1)'th point in time content of the subset and an n'th point in time content of the subset; wherein the interface is further arranged to receive an indication of a boundary of each one of the multiple n'th point of time differences; and wherein the multiple processors are arranged to create an n'th point in time snapshot of the logical volume in response to the multiple n'th point in time differences of multiple subsets of the logical volume and to indications of boundaries of the multiple n'th point in time differences.

* * * * *